United States Patent
Kinugasa

(10) Patent No.: US 9,268,036 B2
(45) Date of Patent: Feb. 23, 2016

(54) RADIATION DETECTOR AND SAMPLE ANALYZER

(71) Applicant: JEOL Ltd., Tokyo (JP)

(72) Inventor: Genki Kinugasa, Tokyo (JP)

(73) Assignee: JEOL Ltd., Tokyo (JP)

( * ) Notice: Subject to any disclaimer, the term of this patent is extended or adjusted under 35 U.S.C. 154(b) by 27 days.

(21) Appl. No.: 14/494,969

(22) Filed: Sep. 24, 2014

(65) Prior Publication Data

US 2015/0083913 A1 Mar. 26, 2015

(30) Foreign Application Priority Data

Sep. 25, 2013 (JP) .................................. 2013-198101

(51) Int. Cl.
*G01T 1/172* (2006.01)
*G01T 1/17* (2006.01)

(52) U.S. Cl.
CPC ................. *G01T 1/172* (2013.01); *G01T 1/171* (2013.01)

(58) Field of Classification Search
CPC ............. G01T 1/17; G01T 1/172; G01T 1/24; G01N 23/2076; G01N 23/223
See application file for complete search history.

(56) References Cited

U.S. PATENT DOCUMENTS

| | | | | |
|---|---|---|---|---|
| 3,872,287 A | * | 3/1975 | Koeman | 250/370.06 |
| 4,658,216 A | * | 4/1987 | Goulding et al. | 327/131 |
| 4,968,898 A | * | 11/1990 | Hushimi et al. | 327/167 |
| 7,430,481 B2 | * | 9/2008 | Mott | 702/40 |
| 2005/0031182 A1 | * | 2/2005 | Inoue | 382/132 |

FOREIGN PATENT DOCUMENTS

| | | |
|---|---|---|
| JP | 10318946 A | 12/1998 |
| JP | 2009229127 A | 10/2009 |

* cited by examiner

*Primary Examiner* — Marcus Taningco
(74) *Attorney, Agent, or Firm* — The Webb Law Firm

(57) ABSTRACT

A radiation detector is offered which can suppress generation of sum peaks. The radiation detector (100) has a radiation detection portion (2), a first differential filter portion (10) for converting the output signal S2 from the detection portion into a first pulsed signal S10, a second differential filter portion (20) for converting the output signal S2 into a second pulsed signal S20, a third differential filter portion (30) having a time constant longer than that of the second differential filter portion (20) and operative to convert the output signal S2 into a third pulsed signal S30, an event detection portion (40) for outputting an event signal S40, a pileup detection portion (50) for outputting a pileup signal S50 in response to the ratio between the pulse height of the second pulsed signal S20 and the pulse height of the third pulsed signal S30, and a pulse height detection portion (60) starting to detect the pulse height of the first pulsed signal S10 in response to the event signal S40 and outputting a detection signal S60. The pulse height detection portion (60) stops from outputting the detection signal S60 in response to the pileup signal S50.

8 Claims, 14 Drawing Sheets

RADIATION DETECTOR AND SAMPLE ANALYZER

BACKGROUND OF THE INVENTION

1. Field of the Invention

The present invention relates to a radiation detector and sample analyzer.

2. Description of Related Art

A radiation detector is an instrument for detecting X-rays, gamma rays, or other radiations. Radiation detectors include known X-ray detectors used to detect X-rays.

Known types of X-ray detectors include energy-dispersive X-ray spectrometers (EDS) and wavelength-dispersive X-ray spectrometers (WDS).

An energy-dispersive X-ray spectrometer detects X-rays emanating, for example, from a sample by means of a semiconductor detector, converts the detected X-rays into an electrical signal, and performs spectroscopic analysis.

For example, in an X-ray fluorescent analyzer (XRF) fitted with an energy-dispersive X-ray spectrometer disclosed in JP-A-10-318946, the output signal from a semiconductor detector is amplified to a given level by a preamplifier and then wave shaped into pulses having heights corresponding to energy values of characteristic X-rays by a wave-shaping circuit. The pulses are sent as a detected X-ray signal to a multichannel analyzer. The analyzer obtains a pulse-height spectrum (also known as an energy spectrum or an X-ray spectrum) by calculating pulse heights indicated by the detected X-ray signal and discriminating the pulse heights. In this energy spectrum, peaks intrinsic to individual elements appear at positions corresponding to the energy values of characteristic X-rays released from the elements contained in the sample.

This energy-dispersive X-ray spectrometer has the problem that sum peaks appear in the obtained X-ray spectrum.

In an energy-dispersive X-ray spectrometer, if a plurality of X-rays impinges on a semiconductor detector within a short interval of time, adjacent pulses interfere with each other, producing an apparently one pulse, so-called pileup. That is, these pulses cannot be recognized as individual pulses. As a result, a peak appears at the sum position of the energies of plural X-rays, apart from spectral peaks from the sample. This peak is a sum peak.

FIG. 21 is a graph showing one example of an X-ray spectrum obtained by measuring a sample containing Mn by an energy-dispersive X-ray spectrometer.

In the X-ray spectrum shown in FIG. 21, a peak appears near the Mn—Kα line (5.9 keV). In addition, a sum peak appears near 11.8 keV that is the sum of the energies of two Mn—Kα lines. Such a sum peak causes incorrect qualitative and quantitative analyses.

In order to suppress sum peaks, it is necessary to enhance the accuracy at which pileup is identified. For example, JP-A-2009-229127 discloses a pulse processor that is configured including a wave-shaping circuit for producing a pulsed signal having pulse heights corresponding to energy levels indicated by an event signal having energy information, a pulse height measuring circuit for measuring the pulse heights of the pulsed signal, a plurality of event detection circuits for producing a first timing signal in response to the event signal, an OR circuit for outputting a second timing signal by ORing the outputs from the event detection circuits, and a pileup detection circuit provided behind the OR circuit.

In the pulse processor of JP-A-2009-229127, if the intensity of the radiation increases and the frequency at which the first timing signal is output using the plural event detection circuits increases, the second timing signal is produced at shorter intervals of time. In this case, pulsed signals delivered from the wave-shaping circuit have more overlap with one another, resulting in pulse pileup. When the time interval between the temporally adjacent portions of the second timing signal is shorter than the time in which each pulse height is measured and processed, a pileup detection circuit determines that pileup has occurred and outputs a signal for stopping the measurement of pulse heights. Consequently, when it is determined that pileup has occurred, the resulting pulse heights are not reflected in the X-ray spectrum. This suppresses generation of sum peaks.

However, even where the event detection circuit has a time constant shorter than that of the wave-shaping circuit, if plural X-rays enter within a short interval of time, pileup may occur in this event detection circuit. If so, in the pulse processor of JP-A-2009-229127, the first timing signal is not output precisely. In particular, if pileup occurs in the event detection circuit, only one cycle of second timing signal is output in response to two events. Therefore, the pileup detection circuit cannot precisely identify pileup. Sum peaks will appear in the X-ray spectrum.

SUMMARY OF THE INVENTION

One object associated with some aspects of the present invention is to offer a radiation detector capable of suppressing generation of sum peaks. Another object associated with some aspects of the invention is to offer a sample analyzer including this radiation detector.

(1) A radiation detector associated with the present invention has: a radiation detection portion for detecting radiations and producing an output signal; a first differential filter portion having a time constant and operative to differentiate the output signal from the radiation detection portion for converting the signal into a first pulsed signal; a second differential filter portion having a time constant shorter than the time constant of the first differential filter portion and operative to differentiate the output signal from the radiation detection portion for converting the signal into a second pulsed signal; a third differential filter portion having a time constant longer than the time constant of the second differential filter portion and shorter than the time constant of the first differential filter portion and operative to differentiate the output signal from the radiation detection portion for converting the signal into a third pulsed signal; an event detection portion for outputting an event signal in response to the second and third pulsed signals; a pileup detection portion for outputting a pileup signal in response to a ratio between the pulse height of the second pulsed signal and the pulse height of the third pulsed signal; and a pulse height detection portion operative to start detection of the pulse height of the first pulsed signal in response to the event signal and to output a detection signal containing information about the pulse height of the first pulsed signal. The pulse height detection portion stops from outputting the detection signal in response to the pileup signal.

According to this radiation detector, the pileup signal is output for stopping the pulse height detection portion from outputting the detection signal in response to the ratio between the pulse height of the second pulsed signal and the pulse height of the third pulsed signal. Therefore, the accuracy at which pileup is identified can be enhanced. As a consequence, generation of sum peaks in a radiation spectrum can be suppressed.

(2) In one feature of this radiation detector, the second differential filter portion may take the nth-order differential of the output signal (where n is an integer equal to or greater than 2 (i.e., n≥2)) from the radiation detection portion to convert the signal into the second pulsed signal.

According to this radiation detector, the accuracy at which pileup is identified by the pileup detection portion can be enhanced.

(3) Another radiation detector associated with the present invention has: a radiation detection portion for detecting radiations and producing an output signal; a first differential filter portion having a time constant and operative to differentiate the output signal from the radiation detection portion for converting the signal into a first pulsed signal; a second differential filter portion having a time constant shorter than the time constant of the first differential filter portion and operative to take the nth-order differential (where n is an integer equal to or greater than 2 (i.e., n≥2)) of the output signal from the radiation detection portion for converting the signal into a second pulsed signal; an event detection portion for outputting an event signal in response to the second pulsed signal; and a pulse height detection portion operative to start detection of the pulse height of the first pulsed signal in response to the event signal and to output a detection signal containing information about the pulse height of the first pulsed signal.

In this radiation detector, the second differential filter portion subjects the output signal from the radiation detection portion to the nth-order differentiation such that the signal is converted into the second pulsed signal. Consequently, the second pulsed signal can be reduced in pulse width. This makes it possible to enhance the accuracy at which pileup is identified. Hence, generation of sum peaks can be suppressed.

(4) In one feature of this radiation detector, there is further provided a pileup detection portion for outputting a pileup signal in response to the event signal. The pulse height detection portion may stop from outputting the detection signal in response to the pileup signal.

According to this radiation detector, generation of sum peaks can be suppressed.

(5) In another feature of the radiation detector associated with the present invention, the output signal from the radiation detection portion may be a staircase waveform having steps of heights corresponding to energies of the radiations.

(6) A sample analyzer associated with the present invention includes a radiation detector associated with the present invention.

This sample analyzer can suppress generation of sum peaks.

DESCRIPTION OF THE INVENTION

The preferred embodiments of the present invention are hereinafter described in detail with reference to the drawings. It is to be understood that the embodiments provided below do not unduly restrict the scope and content of the present invention delineated by the appended claims and that not all the configurations described below are essential constituent components of the invention.

1. First Embodiment 1.1. Configuration of Radiation Detector

Figure 1:
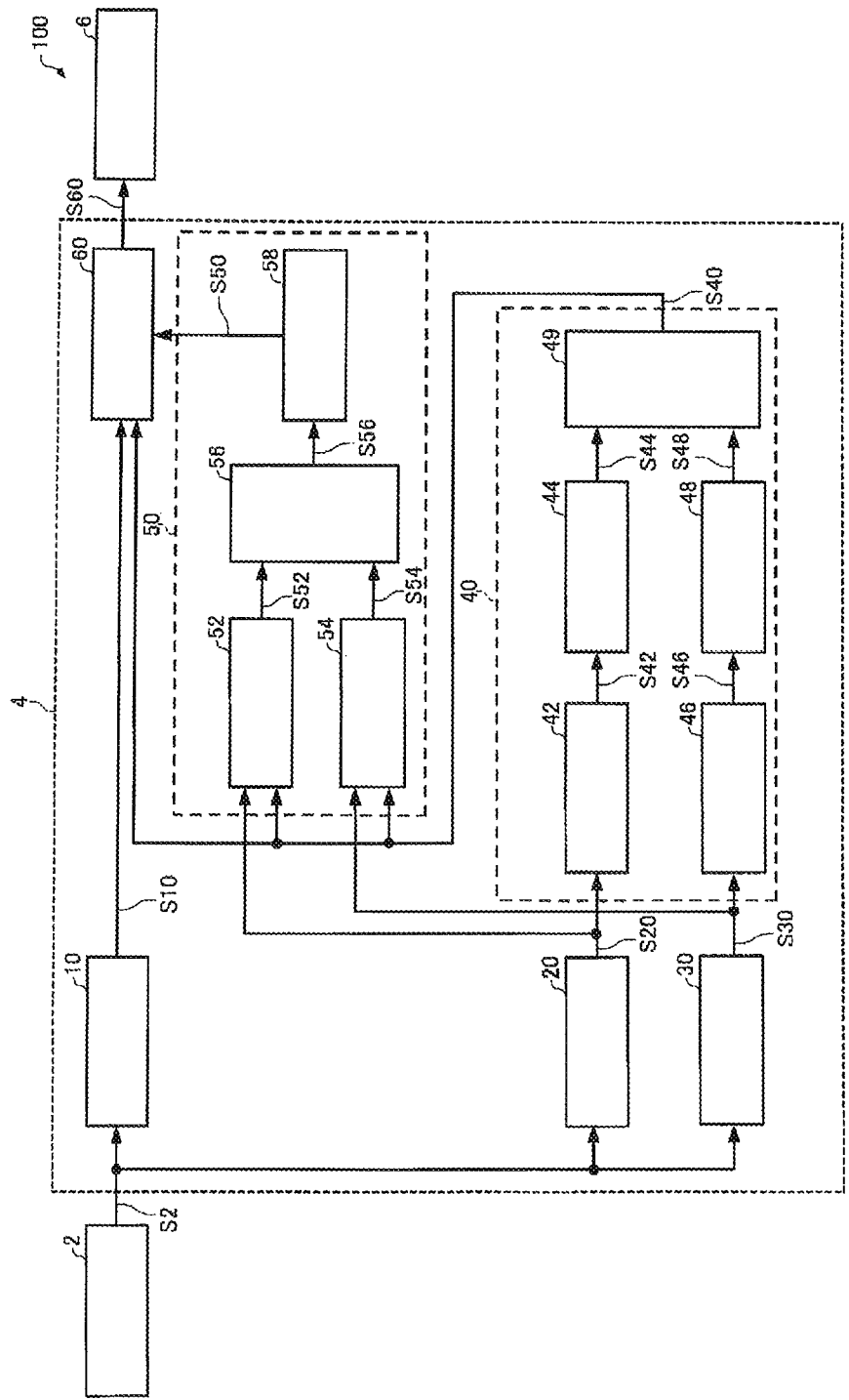
FIG. 1 is a block diagram of a radiation detector associated with a first embodiment of the present invention.

First, the configuration of a radiation detector associated with a first embodiment of the present invention is described by referring to FIG. 1, which is a block diagram of the radiation detector, 100, showing its configuration.

As shown in FIG. 1, the radiation detector 100 is configured including a radiation detection portion 2, signal processing circuitry (pulse processor) 4, and a spectrum generator 6.

The radiation detector 100 is an energy-dispersive radiation detector.

The radiation detection portion 2 detects radiations such as X-rays or gamma rays. In the following description, it is assumed that the radiation detection portion 2 detects X-rays. The radiation detection portion 2 is an energy-dispersive detector such as a semiconductor detector (e.g., an Si (Li) detector or silicon drift detector (SDD)). The radiation detection portion 2 may further include an amplifier that amplifies the output signal from the semiconductor detector and outputs the amplified signal.

Figure 2:
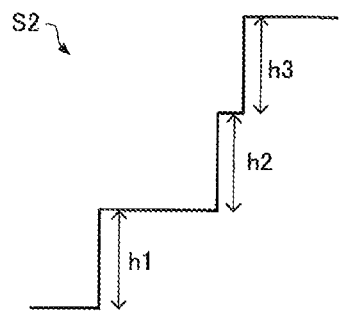
FIG. 2 is a schematic waveform diagram of one example of output signal from the radiation detection portion shown in FIG. 1.

FIG. 2 is a schematic waveform diagram of one example of the output signal S2 from the radiation detection portion 2. In the diagram of FIG. 2, the vertical (heightwise) direction corresponds to X-ray energy. The horizontal direction corresponds to time. The radiation detection portion 2 detects X-rays and outputs a staircase waveform having steps of heights corresponding to the detected X-ray energies. In the example of FIG. 2, the output signal S2 from the radiation detection portion 2 is a staircase waveform having steps of heights h1, h2, and h3 corresponding to the detected X-ray energies. In particular, in the example of FIG. 2, an X-ray having an energy corresponding to the height h1, an X-ray having an energy corresponding to the height h2, and an X-ray having an energy corresponding to the height h3 are detected in this order by the radiation detection portion 2.

As shown in FIG. 1, the output signal S2 from the radiation detection portion 2 is entered to the signal processing circuitry 4. More specifically, the output signal S2 from the radiation detection portion 2 is applied to a first differential filter portion 10, a second differential filter portion 20, and a third differential filter portion 30.

The signal processing circuitry 4 is configured including the first differential filter portion 10, the second differential filter portion 20, the third differential filter portion 30, an event detection portion 40, a pileup detection portion 50, and a first pulse height detection portion 60. The functions of the signal processing circuitry 4 can be accomplished, for example, by dedicated hardware circuitry. The functions of the signal processing circuitry 4 may be realized by a personal computer (PC) or the like.

The first differential filter portion 10 differentiates the output signal S2 from the radiation detection portion 2 to the first order to convert the signal S2 into a first pulsed signal S10. This first pulsed signal S10 generated by the first differential filter portion 10 has pulses having heights (crest values or maximum values) corresponding to the heights of the steps of the output signal S2.

Figure 3:
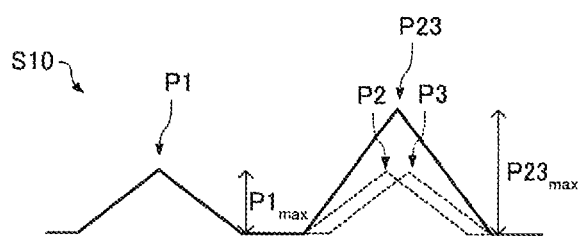
FIG. 3 is a schematic waveform diagram of one example of a first pulsed signal created by the first differential filter portion shown in FIG. 1.

FIG. 3 is a schematic waveform diagram of one example of the first pulsed signal S10 generated by the first differential filter portion 10. This first pulsed signal S10 shown in FIG. 3 has been generated by differentiating the output signal S2 from the radiation detection portion 2 shown in FIG. 2 to the first order by the first differential filter portion 10.

The height $P1_{max}$ of a pulse P1 of the first pulsed signal S10 shown in FIG. 3 corresponds to the height h1 of the step of the output signal S2 shown in FIG. 2. The height $P23_{max}$ of another pulse P23 of the first pulsed signal S10 shown in FIG. 3 corresponds to the sum of the height h2 of one step and the height h3 of a further step of the output signal S2 shown in FIG. 2 because the two adjacent pulses P2 and P3 interfere with each other, producing apparently the single pulse P23.

That is, pileup occurs. The pulse P2 has a height corresponding to the height h2 of one step of the output signal S2 shown in FIG. 2. The pulse P3 has a height corresponding to the height h3 of one step of the output signal S2 shown in FIG. 2.

The first pulsed signal S10 generated by the first differential filter portion 10 is applied to the first pulse height detection portion 60.

The second differential filter portion 20 has a time constant shorter than that of the first differential filter portion 10. A time constant is an index indicative of a response speed. When the time constant is shorter, a higher response occurs, and vice versa. The second differential filter portion 20 differentiates the output signal S2 from the radiation detection portion 2 to the first order to convert the output signal into a second pulsed signal S20. This second pulsed signal S20 generated by the second differential filter portion 20 has a height (crest value or maximum value) corresponding to the height of the step of the output signal S2.

Figure 4:
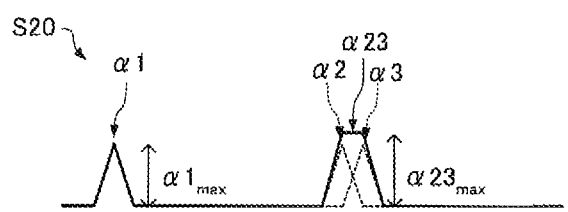
FIG. 4 is a schematic waveform diagram of one example of a second pulsed signal created by the second differential filter portion shown in FIG. 1.

FIG. 4 is a schematic waveform diagram of one example of the second pulsed signal S20 generated by the second differential filter portion 20. This second pulsed signal S20 has been generated by differentiating the output signal S2 from the radiation detection portion 2 shown in FIG. 2 to the first order by the second differential filter portion 20.

The height $\alpha 1_{max}$ of a pulse $\alpha 1$ of the second pulsed signal S20 shown in FIG. 4 corresponds to the height h1 of one step of the output signal S2 shown in FIG. 2. The height $\alpha 23_{max}$ of a pulse $\alpha 23$ of the second pulsed signal S20 shown in FIG. 4 corresponds, for example, to the sum of the height h2 of one step of the output signal S2 shown in FIG. 2 and the height h3 of another step because two adjacent pulses $\alpha 2$ and $\alpha 3$ interfere with each other, resulting in pileup. The pulse $\alpha 2$ has a height corresponding to the height h2 of one step of the output signal S2 shown in FIG. 2. The pulse $\alpha 3$ has a height corresponding to the height h3 of another step of the output signal S2 shown in FIG. 2.

The second pulsed signal S20 generated by the second differential filter portion 20 is applied to a comparison portion 42 of the event detection portion 40 and to a second pulse height detection portion 52 of the pileup detection portion 50 as shown in FIG. 1.

The third differential filter portion 30 has a time constant that is shorter than that of the first differential filter portion 10 and longer than that of the second differential filter portion 20. The third differential filter portion 30 differentiates the output signal S2 from the radiation detection portion 2 to the first order to convert the output signal S2 into a third pulsed signal S30. This third pulsed signal S30 has a height (crest value or maximum value) corresponding to the height of a further step of the output signal S2.

Figure 5:
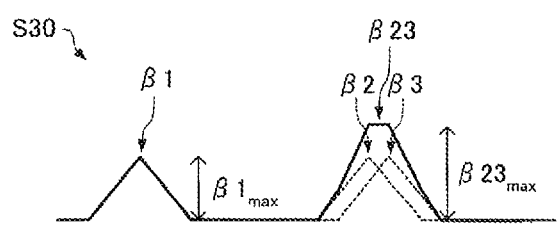
FIG. 5 is a schematic waveform diagram of one example of a third pulsed signal created by the third differential filter portion shown in FIG. 1.

FIG. 5 is a schematic waveform diagram showing one example of the third pulsed signal S30 generated by the third differential filter portion 30. The third pulsed signal S30 shown in FIG. 5 has been generated by differentiating the output signal S2 from the radiation detection portion 2 shown in FIG. 2 to the first order by the third differential filter portion 30.

The height $\beta 1_{max}$ of a pulse $\beta 1$ of the third pulsed signal S30 shown in FIG. 5 corresponds to the height h1 of one step of the output signal S2 shown in FIG. 2. The height $\beta 23_{max}$ of a pulse $\beta 23$ of the third pulsed signal S30 shown in FIG. 5 corresponds, for example, to the sum of the height h2 of another step of the output signal S2 shown in FIG. 2 and the height h3 of a further step because two adjacent pulses $\beta 2$ and $\beta 3$ interfere with each other, resulting in pileup. The pulse $\beta 2$ has a height corresponding to the height h2 of another step of the output signal S2 shown in FIG. 2. The pulse $\beta 3$ has a height corresponding to the height h3 of a further step of the output signal S2 shown in FIG. 2.

The third pulsed signal S30 generated by the third differential filter portion 30 is applied to a comparison portion 46 of the event detection portion 40 and to a third pulse height detection portion 54 of the pileup detection portion 50 as shown in FIG. 1.

As described previously, the first differential filter portion 10, the third differential filter portion 30, and the second differential filter portion 20 have successively decreasing time constants. Therefore, the pulses P1, P2, and P3 of the first pulsed signal S10 shown in FIG. 3 have the greatest pulse width. The pulses β1, β2, and β3 of the third pulsed signal S30 shown in FIG. 5 have a moderate pulse width. The pulses α1, α2, and α3 of the second pulsed signal S20 shown in FIG. 4 have a minimum pulse width.

The event detection portion 40 is configured including comparison portions 42, 46, rising edge detection portions 44, 48, and arithmetic circuitry 49. The event detection portion 40 outputs an event signal S40 in response to both second pulsed signal S20 and third pulsed signal S30. The event signal S40 indicates generation of one event, i.e., detection of one radiation at the radiation detection portion 2.

Figure 6:
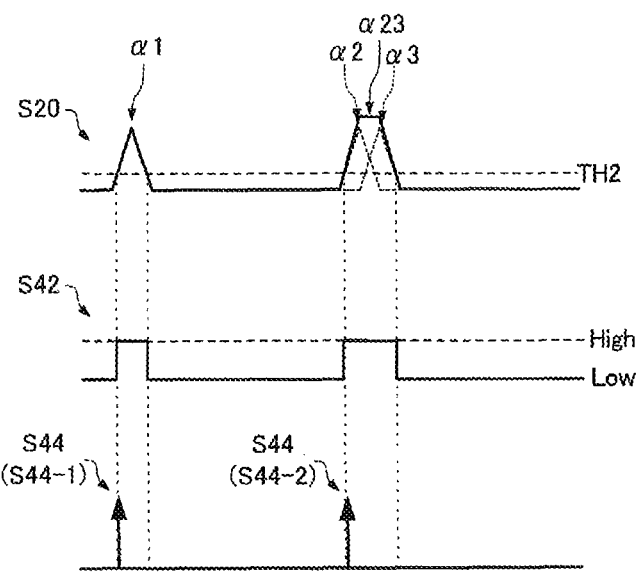
FIG. 6 is a schematic waveform diagram of one example of output signal from one comparison portion and one example of output signal from one rising edge detection portion, the comparison portion and the rising edge detection portion being shown in FIG. 1.

FIG. 6 is a schematic waveform showing one example of the output signal S42 from the comparison portion 42 and one example of the output signal S44 from the rising edge detection portion 44.

The comparison portion 42 performs an operation to compare the second pulsed signal S20 generated by the second differential filter portion 20 and a reference signal giving a threshold value TH2.

The comparison portion 42 provides the output signal S42 that goes High when the level of the second pulsed signal S20 is equal to or higher than the threshold value TH2 and goes Low when the level of the second pulsed signal S20 is less than the threshold value TH2 as shown in FIG. 6. For example, the threshold value TH2 is set to such a value that the rising edges of the pulses α1 and α23 can be detected.

The rising edge detection portion 44 detects the rising edge of the output signal S42 from the comparison portion 42. As shown in FIG. 6, when the output signal S42 from the comparison portion 42 rises, the rising edge detection portion 44 provides the output signal S44 that is a given pulsed signal.

The output signal S44 from the rising edge detection portion 44 is applied to the arithmetic circuitry 49.

Figure 7:
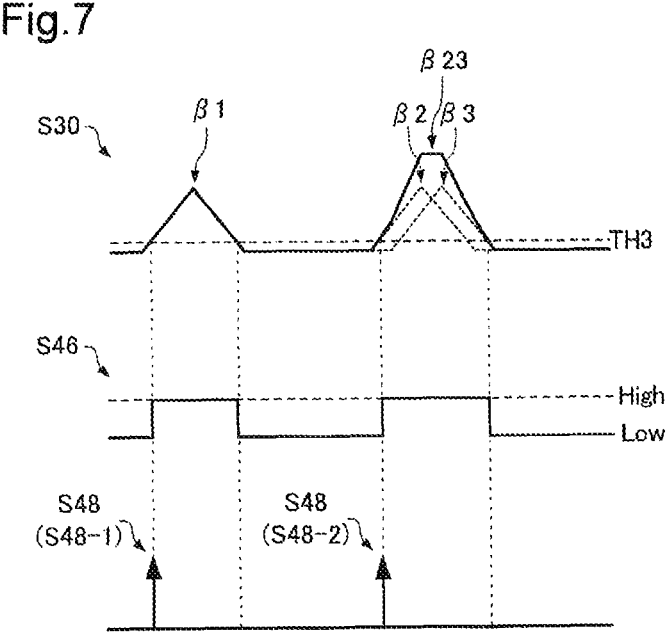
FIG. 7 is a schematic waveform diagram of one example of output signal from a second comparison portion and one example of output signal from a second rising edge detection portion, the second comparison portion and the second rising edge detection portion being shown in FIG. 1.

FIG. 7 is a schematic waveform diagram showing one example of the output signal S46 from the comparison portion 46 and one example of the output signal S48 from the rising edge detection portion 48.

The comparison portion 46 performs an operation to compare the third pulsed signal S30 generated by the third differential filter portion 30 and a reference signal giving a threshold value TH3.

The comparison portion 46 provides the output signal S46 which goes High when the level of the third pulsed signal S30 is equal to or higher than the threshold value TH3 and goes Low when the level of the third pulsed signal S30 is less than the threshold value TH3 as shown in FIG. 7. For example, the threshold value TH3 is set to such a value that the rising edges of the pulses β1 and β23 can be detected. As one example, the threshold value TH3 is smaller than the threshold value TH2.

The rising edge detection portion 48 detects the rising edge of the output signal S46 from the comparison portion 46. When the output signal S46 from the comparison portion 46 rises, the rising edge detection portion 48 provides the output signal S48 as shown in FIG. 7, the output signal S48 being a given pulsed signal.

The output signal S48 from the rising edge detection portion 48 is applied to the arithmetic circuitry 49.

When at least one of the output signal S44 from the rising edge detection portion 44 and the output signal S48 from the rising edge detection portion 48 is applied, the arithmetic circuitry 49 outputs the event signal S40. The function of the arithmetic circuitry 49 can be implemented, for example, by an OR circuit.

Since the second differential filter portion 20 has a time constant shorter than that of the third differential filter portion 30, the filter portion 20 has a higher time resolution. On the other hand, the third differential filter portion 30 has a time constant longer than that of the second differential filter portion 20 and so has a lower time resolution. However, the filter portion 30 can reduce the amount of noise contained in the generated third pulsed signal S30. Therefore, the threshold value TH3 of the comparison portion 46 can be set smaller than the threshold value TH2 of the comparison portion 42. Hence, even radiations having low energies can be detected more reliably. In this way, the event detection portion 40 can detect events accurately by the use of the plural differential filter portions 20 and 30 of different time constants.

The event signal S40 generated by the arithmetic circuitry 49 is applied to the first pulse height detection portion 60 and to the second pulse height detection portion 52 and the third pulse height detection portion 54 of the pileup detection portion 50 as shown in FIG. 1.

The pileup detection portion 50 outputs a pileup signal based on the ratio between the pulse height of the second pulsed signal S20 and the pulse height of the third pulsed signal S30. The pileup signal is used to stop the first pulse height detection portion 60 from providing its output signal when pileup occurs.

The pileup detection portion 50 makes a decision as to whether pileup has occurred, by making use of the principle that the ratio of the pulse heights obtained by the two differential filters of different time constants varies depending on whether or not pileup has occurred. This principle is described below.

Figure 8:
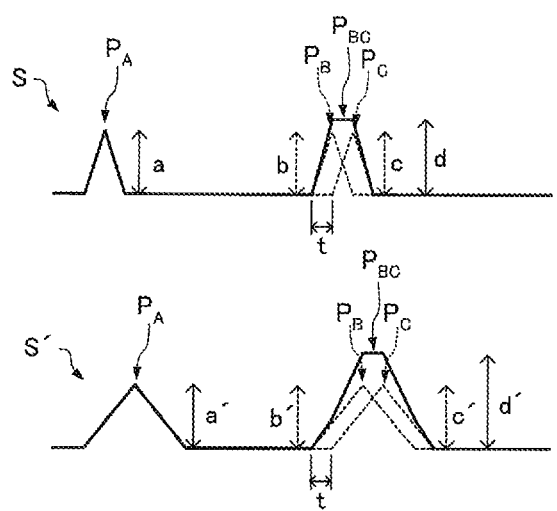
FIG. 8 is a schematic waveform diagram showing examples of pulsed signal obtained by differential filters having different time constants.

FIG. 8 is a schematic waveform diagram showing one example of a set of pulsed signals S and S' obtained by differential filters with different time constants. The pulsed signal S has been obtained by the differential filter with the shorter time constant. The pulsed signal S' has been obtained by the differential filter with the longer time constant. Each of the pulsed signals S and S' has pulse portions $P_A$, $P_B$, and $P_C$ which are produced by detection of X-rays A, B, and C, respectively, by means of the radiation detection portion. It is assumed that the time duration between the instant at which the X-ray A enters the radiation detection portion and the instant at which the X-ray B enters the radiation detection portion is sufficiently long and that the time duration between the instant at which the X-ray B enters the detection portion and the instant at which the X-ray C enters the detection portion is short.

Since the duration of time between the instant at which the X-ray A enters the radiation detection portion and the instant at which the X-ray B enters the detection portion is sufficiently long, the pulse portions $P_A$ and $P_B$ of the pulsed signals S and S' do not interfere as shown in FIG. 8. On the other hand, since the time duration between the instant at which the X-ray B enters and the instant at which the X-ray C enters is short, the pulse portions $P_B$ and $P_C$ of the pulsed signals S and S' interfere with each other, forming one pulse $P_{BC}$. That is, pileup has occurred.

Let t be the duration between the instant at which the X-ray B enters the radiation detection portion and the instant at which the X-ray C enters the detection portion. When t=0, the pulse height d of the pulse portion $P_{BC}$ of the pulsed signal S is the sum, b+c, of the pulse height b of the pulse portion $P_B$ and the pulse height c of the pulse portion $P_C$. As the time t increases, the pulse height d assumes any greater one of the pulse heights b and c.

The pulse height d' of the pulse portion $P_{BC}$ of the pulsed signal S' behaves similarly. When t=0, the pulse height d' is the sum, b'+c', of the pulse height b' of the pulse portion $P_B$ and the pulse height c' of the pulse portion $P_C$. As the time t increases, the pulse height d' assumes any greater one of the pulse heights b' and c'. The relationship between the pulse heights d and d' is shown in FIG. 9.

Figure 9:
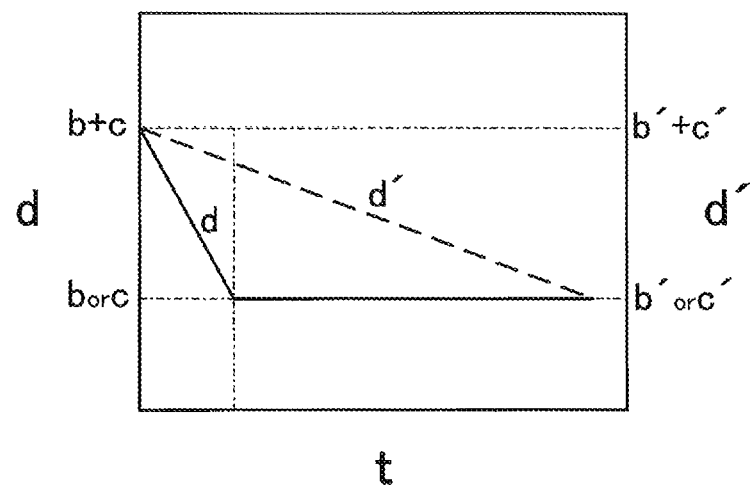
FIG. 9 is a diagram illustrating the relation between pulse heights d and d'.

As shown in FIG. 9, the tilt of the pulse height d relative to the time t is different from the tilt of the pulse height d' relative to the time t. Therefore, the ratio d/d' of the pulse height d to the pulse height d' and the ratio a/a' of the pulse height a to the pulse height a' satisfy a relation d/d'=a/a' at time t=0. At times t≠0, d/d'<a/a'.

In this way, at times t≠0, the relationship, d/d'<a/a', holds. The value of the ratio a/a' is constant. Therefore, it is possible to discriminate the case where pileup has occurred from the case where no pileup has occurred, using the ratio of pulse heights produced by two differential filters with different time constants. In particular, a threshold value used to make a decision as to whether pileup has occurred is set to a given value that is smaller than the ratio a/a' of the pulse heights produced by two differential filters with different time constants when no pileup occurs. Consequently, when the threshold value is reached or exceeded, it is possible to determine that there is no pileup. When the threshold value is not reached, it is possible to determine that there is pileup. The threshold value is appropriately set, for example, depending on the stability of the instrument and on a tolerable amount of pileup.

The configuration of the pileup detection portion 50 is next described in detail. As shown in FIG. 1, the pileup detection portion 50 is configured including the second pulse height detection portion 52, the third pulse height detection portion 54, a divider portion 56, and a comparison portion 58.

The second pulse height detection portion 52 begins to detect the pulse heights of pulses of the second pulsed signal S20 in response to the event signal S40 and outputs a detection signal S52 containing information about the pulse heights of the pulses of the second pulsed signal S20.

Figure 10:
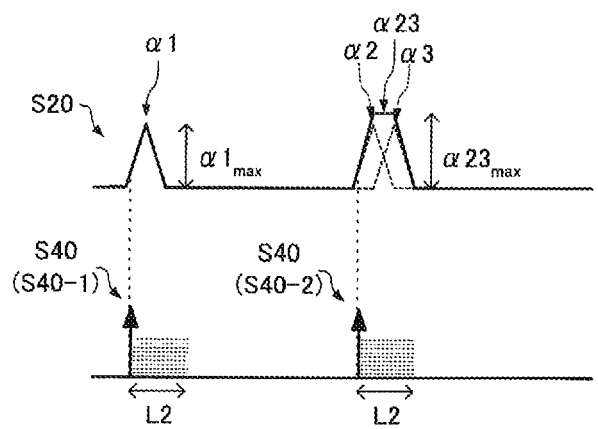
FIG. 10 is a waveform diagram illustrating the processing performed by the second pulse height detection portion shown in FIG. 1.

FIG. 10 is a waveform diagram illustrating the processing performed by the second pulse height detection portion 52. When the event signal S40 is applied, the second pulse height detection portion 52 begins to detect the pulse heights of pulses of the second pulsed signal S20. The detection portion 52 detects a maximum value of the second pulsed signal S20 within a given period of time L2 since the beginning of the detection. The given period of time L2 is set to correspond, for example, to a period beginning with rising of one peak of the second pulsed signal S20 and ending with falling of the peak. The given period of time L2 is set according to the time constant of the second differential filter portion 20. In the illustrated example, the second pulse height detection portion 52 detects the crest value (height) $\alpha1_{max}$ of pulse $\alpha1$ in response to the first portion of the event signal S40-1 and detects the crest value (height) $\alpha23_{max}$ of pulse $\alpha23$ in response to the second portion of the event signal S40-2. The detection signal S52 is applied to the divider portion 56.

The third pulse height detection portion 54 begins to detect the crest values of pulses of the third pulsed signal S30 in response to the event signal S40 and outputs a detection signal S54 containing information about the heights of the pulses of the third pulsed signal S30.

Figure 11:
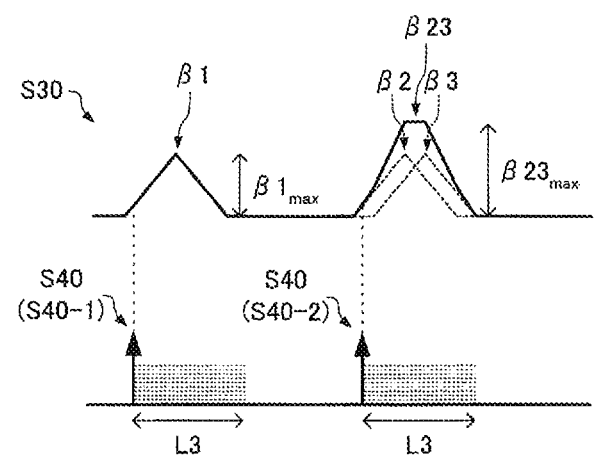
FIG. 11 is a waveform diagram illustrating the processing performed by the third pulse height detection portion shown in FIG. 1.

FIG. 11 is a waveform diagram illustrating the processing performed by the third pulse height detection portion 54. When the event signal S40 is entered, the third pulse height detection portion 54 begins to detect the heights of pulses of the third pulsed signal S30. The third pulse height detection portion 54 detects a maximum value of the third pulsed signal S30 within a given period L3 since the beginning of the detection. For example, the given period of time L3 is set to correspond to a period beginning with rising of one pulse of the third pulsed signal S30 and ending with falling of the pulse. The given period of time L3 is set, for example, according to the time constant of the third differential filter portion 30. In the illustrated example, the third pulse height detection portion 54 detects the pulse height $\beta1_{max}$ of pulse $\beta1$ in response to the first portion of the event signal S40-1 and detects the pulse height $\beta23_{max}$ of pulse $\beta23$ in response to the second portion of the event signal S40-2. The detection signal S54 is applied to the divider portion 56.

The divider portion 56 obtains information about the heights of pulses of the second pulsed signal S20 detected by the second pulse height detection portion 52 and information about the heights of pulses of the third pulsed signal S30 detected by the third pulse height detection portion 54. The divider portion 56 calculates the ratio of pulse heights by dividing the height of the pulse of the second pulsed signal S20 by the height of the pulse of the third pulsed signal S30.

In the examples of FIGS. 10 and 11, the divider portion 56 calculates the pulse height ratio ($\alpha1_{max}/\beta1_{max}$) by dividing the crest value $\alpha1_{max}$ of the second pulsed signal S20 detected by the second pulse height detection portion 52 in response to the first portion of the event signal S40-1 by the pulse height $\beta1_{max}$ of the third pulsed signal S30 detected by the third pulse height detection portion 54 in response to the first portion of the event signal S40-1. Similarly, the divider portion 56 calculates the pulse height ratio ($\alpha23_{max}/\beta23_{max}$) by dividing the pulse height $\alpha23_{max}$ of the second pulsed signal S20 detected by the second pulse height detection portion 52 in response to the second portion of the event signal S40-2 by the pulse height $\beta23_{max}$ of the pulse of the third pulsed signal S30 detected by the third pulse height detection portion 54 in response to the second portion of event signal S40-2. An output signal S56 from the divider portion 56 that indicates the calculated pulse height ratios is supplied to the comparison portion 58.

The comparison portion 58 outputs a pileup signal S50 based on the pulse height ratio calculated by the divider portion 56. In particular, the comparison portion 58 does not output the pileup signal S50 when the pulse height ratio calculated by the divider portion 56 is equal to or greater than a threshold value TH4 indicated by a reference signal. The comparison portion 58 outputs the pileup signal S50 when the pulse height ratio calculated by the divider portion 56 is less than the threshold value TH4 indicated by the reference signal. The threshold value TH4 is set to a given value smaller than, for example, the pulse height ratio ($\alpha1_{max}/\beta1_{max}$) occurring when there is no pileup.

The first pulse height detection portion 60 starts to detect pulse heights of the first pulsed signal S10 in response to the event signal S40 and outputs a detection signal S60 containing information about the pulse heights of the first pulsed signal S10. The first pulse height detection portion 60 stops from outputting the detection signal S60 in response to the pileup signal S50.

Figure 12:
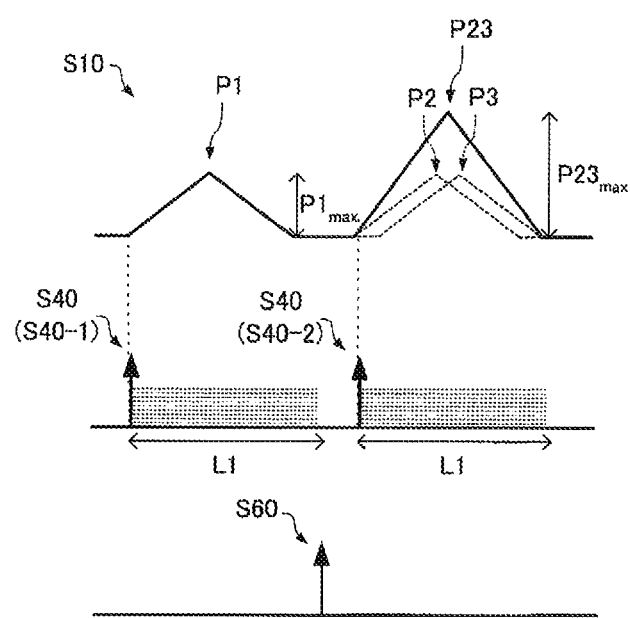
FIG. 12 is a waveform diagram illustrating processing performed by the first pulse height detection portion shown in FIG. 1.

FIG. 12 is a waveform diagram illustrating processing performed by the first pulse height detection portion 60. When the event signal S40 is applied, the first pulse height detection portion 60 starts to detect pulse heights of the first pulsed signal S10 as shown in FIG. 12. The first pulse height detection portion 60 detects a maximum value of the first pulsed signal S10 within a given period L1 since the beginning of the detection. The given period L1 is set, for example, to correspond to the period beginning with rising of one peak of the first pulsed signal S10 and ending with falling of the peak. The given period L1 is set, for example, according to the time constant of the first differential filter portion 10. In the illustrated example, the first pulse height detection portion 60 detects the height $P1_{max}$ of the pulse P1 in response to the first portion of the event signal S40-1 and detects the height $P23_{max}$ of the pulse P23 in response to the second portion of the event signal S40-2.

When the pileup signal S50 is not applied, the first pulse height detection portion 60 outputs the detection signal S60 containing information about the detected pulse height. When the pileup signal S50 is applied, the first pulse height detection portion 60 does not output the detection signal S60. In the illustrated example, when the detection signal S60 containing information about the pulse height $P1_{max}$ detected in response to the first portion of the event signal S40-1 is output, the pileup signal S50 is not applied to the first pulse height detection portion 60 and so the detection portion 60 outputs the detection signal S60 containing information about the pulse height $P1_{max}$. When the detection signal S60 containing information about the pulse height $P23_{max}$ detected in response to the second portion of the event signal S40-2 is output, the pileup signal S50 is applied to the first pulse height detection portion 60 and, therefore, the detection portion 60 does not output the detection signal S60 containing information about the pulse height $P23_{max}$.

When the detection signal S60 containing information about the crest value (pulse height) is entered, the spectrum generator 6 performs an operation to discriminate different pulse heights, count them, and create an X-ray spectrum (also referred to as an energy spectrum or a pulse height spectrum), where pulse height (i.e., X-ray energy) is plotted on the horizontal axis and the number of counts is plotted on the vertical axis.

The function of the spectrum generator 6 can be implemented, for example, by a personal computer (PC) or dedicated hardware circuitry.

1.2. Operation of Radiation Detector

Figure 13:
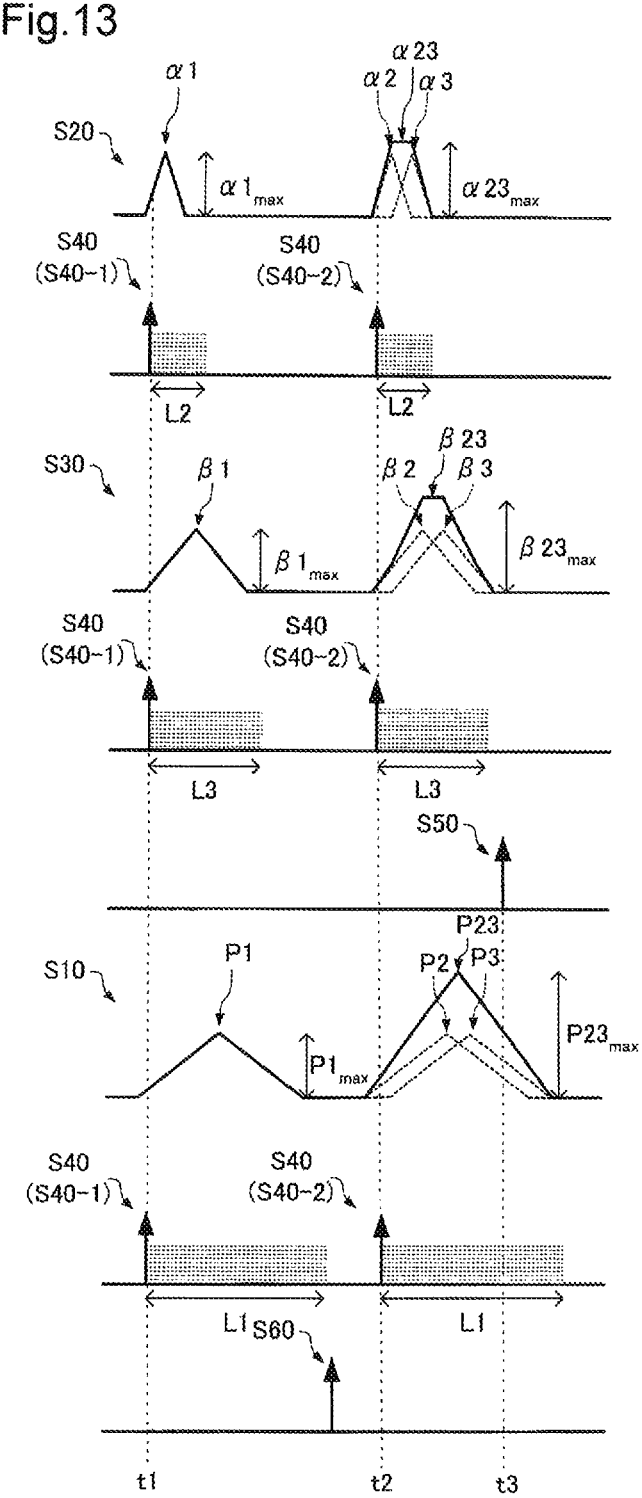
FIG. 13 is a waveform diagram illustrating one example of a set of temporal relationships among various signals in the signal processing circuitry of the radiation detector shown in FIG. 1.

The operation of the radiation detector 100 associated with the first embodiment is next described by referring to FIG. 13, which is a waveform diagram illustrating one example of a set of temporal relationships among various signals in the signal processing circuitry 4 of the radiation detector 100.

When a first X-ray enters the radiation detection portion 2, a first step having a height of h1 appears at the output signal S2 from the radiation detection portion 2 as shown in FIG. 2.

The differential filter portions 10, 20, and 30 differentiate the output signal S2. As a result, pulses P1, α1, and β1 corresponding to the first step of the output signal S2 appear at the first pulsed signal S10, second pulsed signal S20, and third pulsed signal S30, respectively, as shown in FIG. 13.

At this time, in the event detection portion 40, the height of the second pulsed signal S20 is made to reach or exceed the threshold value TH2 by the pulse α1 as shown in FIG. 6. The output signal S42 from the comparison portion 42 is switched from Low to High level. The rising edge detection portion 44 detects the rising edge of the output signal S42 and provides an output signal S44-1. Similarly, as shown in FIG. 7, the height of the third pulsed signal S30 is made to reach or exceed the threshold value TH3 by the pulse β1. The output signal S46 from the comparison portion 46 is switched from Low to High level. The rising edge detection portion 48 detects the rising edge of the output signal S46 and provides an output signal S48-1.

The arithmetic circuitry 49 receives the output signal S44-1 from the rising edge detection portion 44 and the output signal S48-1 from the rising edge detection portion 48 and outputs one event signal S40-1. As shown in FIG. 13, the event signal S40-1 is applied to the pulse height detection portions 52, 54, and 60 at time t1.

In the pileup detection portion 50, if the event signal S40-1 is applied to the pulse height detection portions 52 and 54, the second pulse height detection portion 52 starts to detect the pulse height of the second pulsed signal S20. The third pulse height detection portion 54 starts to detect the pulse height of the third pulsed signal S30. The second pulse height detection portion 52 outputs the detection signal S52 containing information about the detected height $α1_{max}$ of the pulse α1. The third pulse height detection portion 54 outputs the detection signal S54 containing information about the detected peak $β1_{max}$ of the pulse β1.

The divider portion 56 receives the detection signals S52 and S54 and calculates the pulse height ratio ($α1_{max}/β1_{max}$) by dividing the pulse height $α1_{max}$ detected by the second pulse height detection portion 52 by the pulse height $β1_{max}$ detected by the third pulse height detection portion 54.

The comparison portion 58 compares the pulse height ratio ($α1_{max}/β1_{max}$) and the threshold value TH4. Since the threshold value TH4 is set smaller than the pulse height ratio occurring when there is no pileup, the pulse height ratio ($α1_{max}/β1_{max}$) is greater than the threshold value TH4. Therefore, the comparison portion 58 does not output the pileup signal S50.

On the other hand, when the event signal S40-1 is entered, the first pulse height detection portion 60 starts to detect the pulse height of the first pulsed signal S10. Since the pileup signal S50 is not entered during a period, for example, of L1 beginning with the start of the detection at time t1, the first pulse height detection portion 60 outputs the detection signal S60 containing information about the height $P1_{max}$ of the detected pulse P1. Consequently, the information about the height $P1_{max}$ of the pulse P1 is sent to the spectrum generator 6.

Then, if two X-rays enter the radiation detection portion 2 at a short interval of time, a second step having a height of h2 and a third step having a height of h3 appear at the output signal S2 from the radiation detection portion 2 as shown in FIG. 2.

The differential filter portions 10, 20, and 30 differentiate the output signal S2. As a result, as shown in FIG. 13, a pulse P23 appears at the first pulsed signal S10 because the pulses P2 and P3 interfere with each other. A pulse α23 appears at the second pulsed signal S20 because the pulses α2 and α3 interfere with each other. A pulse β23 appears at the third pulsed signal S30 because the pulses β2 and β3 interfere with each other.

At this time, in the event detection portion 40, the height of the second pulsed signal S20 is made to reach or exceed the threshold value TH2 by the pulse α23 as shown in FIG. 6. The output signal S42 from the comparison portion 42 is switched from Low to High level. The rising edge detection portion 44 detects the rising edge of the output signal S42 and provides an output signal S44-2. Similarly, as shown in FIG. 7, the height of the third pulsed signal S30 is made to reach or exceed the threshold value TH3 by the pulse β23. The output signal S46 from the comparison portion 46 is switched from Low to High level. The rising edge detection portion 48 detects the rising edge of the output signal S46 and provides an output signal S48-2.

The arithmetic circuitry 49 receives the output signal S44-2 from the rising edge detection portion 44 and the output signal S48-2 from the rising edge detection portion 48 and outputs one event signal S40-2. As shown in FIG. 13, the event signal S40-2 is applied to the pulse height detection portions 52, 54, and 60 at time t2.

In the pileup detection portion 50, if the event signal S40-2 is applied to the pulse height detection portions 52 and 54, the second pulse height detection portion 52 starts to detect the pulse height of the second pulsed signal S20, and the third pulse height detection portion 54 begins to detect the pulse height of the third pulsed signal S30. The second pulse height detection portion 52 outputs the detection signal S52 containing information about the height $\alpha 23_{max}$ of the detected pulse α23. The third pulse height detection portion 54 outputs the detection signal S54 containing information about the height $\beta 23_{max}$ of the detected pulse β23.

The divider portion 56 receives the detection signals S52 and S54 and calculates the pulse height ratio ($\alpha 23_{max}/\beta 23_{max}$) by dividing the pulse height $\alpha 23_{max}$ detected by the second pulse height detection portion 52 by the pulse height $\beta 23_{max}$ detected by the third pulse height detection portion 54.

The comparison portion 58 compares the pulse height ratio ($\alpha 23_{max}/\beta 23_{max}$) and the threshold value TH4. Since the threshold value TH4 is set smaller than the pulse height ratio occurring when there is no pileup, the pulse height ratio ($\alpha 23_{max}/\beta 23_{max}$) is smaller than the threshold value TH4. Therefore, the comparison portion 58 outputs the pileup signal S50 at time t3 as shown in FIG. 13.

On the other hand, if the event signal S40-2 is entered, the first pulse height detection portion 60 starts to detect the pulse height of the first pulsed signal S10. The pileup signal S50 is applied to the first pulse height detection portion 60 while a pulse height is being detected in response to the event signal S40-2 at time t3. Consequently, the first pulse height detection portion 60 does not output the detection signal S60 containing information about the height $P23_{max}$ of the detected pulse P23. Hence, the information about the height $P23_{max}$ of the pulse P23 is not sent to the spectrum generator 6.

The processing steps described so far are repeated. When pulse pileup has occurred, information about a pulse height corresponding to an X-ray energy is not sent to the spectrum generator 6. When there is no pulse pileup, the information about the pulse height is sent. Consequently, the spectrum generator 6 builds an X-ray spectrum in which generation of sum peaks is suppressed.

The radiation detector 100 has the following features. The radiation detector 100 has: the radiation detection portion 2 for detecting radiations; the first differential filter portion 10 for differentiating the output signal S2 from the radiation detection portion 2 to convert the signal S2 into the first pulsed signal S10; the second differential filter portion 20 having a time constant shorter than that of the first differential filter portion 10 and operative to differentiate the output signal S2 from the radiation detection portion 2 to convert the signal S2 into the second pulsed signal S20; the third differential filter portion 30 having a time constant longer than that of the second differential filter portion 20 and shorter than that of the first differential filter portion 10 and operative to differentiate the output signal S2 from the radiation detection portion 2 to convert the signal S2 into the third pulsed signal S30; the event detection portion 40 outputting the event signal S40 in response to the second pulsed signal S20 and third pulsed signal S30; the pileup detection portion 50 outputting the pileup signal S50 based on the pulse height ratio between the second pulsed signal S20 and the third pulsed signal S30; and the pulse height detection portion 60 starting to detect the pulse height of the first pulsed signal S10 in response to the event signal S40 and outputting the detection signal S60 containing information about the pulse height of the first pulsed signal S10. The pulse height detection portion 60 stops from outputting the detection signal S60 in response to the pileup signal S50. The radiation detector 100 outputs the pileup signal based on the ratio between the pulse height of the second pulsed signal S20 and the pulse height of the third pulsed signal S30 in this way. Therefore, the accuracy at which pileup is identified can be enhanced. Consequently, generation of sum peaks in a radiation spectrum (X-ray spectrum) can be suppressed. For example, where X-rays enter at such short intervals that the X-rays cannot be separated by a differential filter for detecting events, i.e., where peak pileup occurs at the differential filter for detecting events, the radiation detector 100 can precisely identify pileups and suppress generation of sum peaks.

Figure 14:
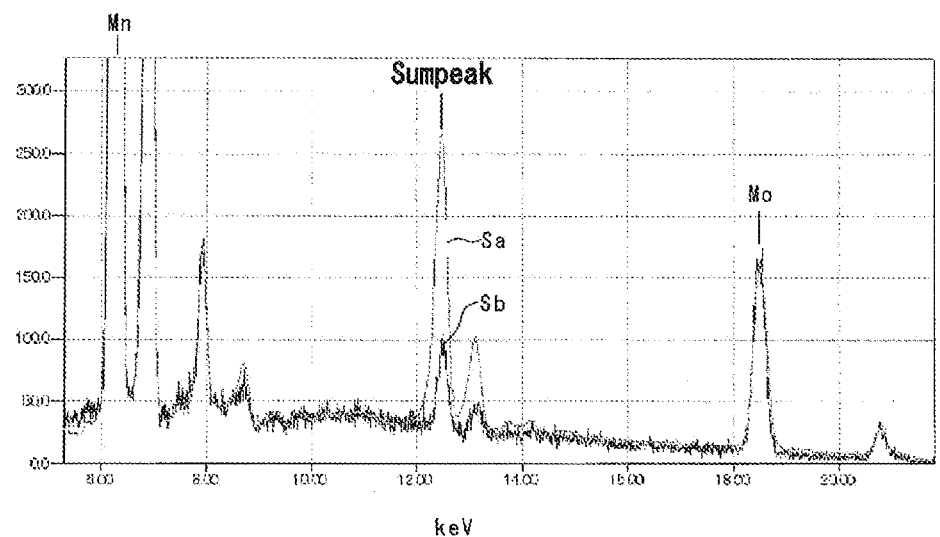
FIG. 14 is a graph showing one example of X-ray spectrum obtained by the radiation detector shown in FIG. 1 and one example of X-ray spectrum obtained by a radiation detector that provides a comparative example.

FIG. 14 is a graph showing one example of X-ray spectrum Sb obtained by the radiation detector 100 and one example of X-ray spectrum Sa obtained by a radiation detector that provides a comparative example. The radiation detector providing a comparative example determines that pulse pileup has occurred when the time interval between the temporally adjacent portions of the event signal is shorter than the pulse height measuring and processing time. A sample containing Mn was used.

As can be seen from FIG. 14, generation of sum peaks is suppressed in the radiation detector 100.

1.3. Modified Embodiment

Figure 15:
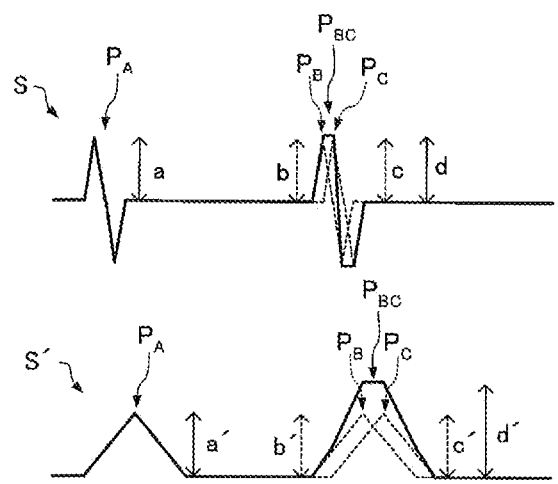
FIG. 15 is a schematic waveform diagram showing examples of pulsed signals S and S' obtained by differential filters having different time constants.

A modified embodiment of the radiation detector 100 associated with the first embodiment is next described by referring to FIG. 15. Only the differences with the above-described radiation detector 100 are described; description of similarities is omitted.

In the above-described radiation detector 100, the second differential filter portion 20 differentiates the output signal S2 from the radiation detection portion 2 to the first order to convert the signal into the second pulsed signal S20.

In contrast, in the present modified embodiment, the second differential filter portion 20 differentiates the output signal S2 from the radiation detection portion 2 to the second order to convert the signal into the second pulsed signal S20.

FIG. 15 is a schematic waveform diagram showing examples of pulsed signals S and S' obtained by differential filters with different time constants. The pulsed signal S is obtained by the differential filter with a shorter time constant. The pulsed signal S' is obtained by the differential filter with a longer time constant. The differential filter with the shorter time constant performs second-order differentiation. The differential filter with the longer time constant performs first-order differentiation. The other conditions are the same as the conditions of the above-described example of FIG. 8.

The pulse width of the pulsed signal S obtained by second-order differentiation is smaller than the pulse width of the pulsed signal S' obtained by first-order differentiation. Therefore, where the pulsed signal S is obtained by second-order differentiation, the difference between the ratio a/a' and the ratio d/d' is greater than where the pulsed signal S' is obtained by first-order differentiation. Consequently, it is possible to make a more precise decision as to whether or not pileup has occurred.

According to the present modified embodiment, the second differential filter portion 20 takes the second-order differential of the output signal S2 from the radiation detection portion 2 to convert the signal into the second pulsed signal S20. Therefore, the accuracy at which pileup is identified by the pileup detection portion 50 can be enhanced further.

In the present example, the second differential filter portion 20 takes the second-order differential of the output signal S2 to convert it into the second pulsed signal S20. Alternatively, the second differential filter portion 20 may take the third-order differential of the output signal S2 to convert it into the second pulsed signal S20. The pulse width can be made smaller than where the output signal S2 is quadratically differentiated. Consequently, the accuracy at which the pileup signal is identified or judged can be enhanced further.

In addition, the second differential filter portion 20 may take the nth-order differential (where n is an integer equal to or greater than 2, i.e., n≥2) (which is not restricted to the second-order and third-order differentials) of the output signal S2 to convert it into the second pulsed signal S20.

2. Second Embodiment 2.1. Configuration of Radiation Detector

Figure 16:
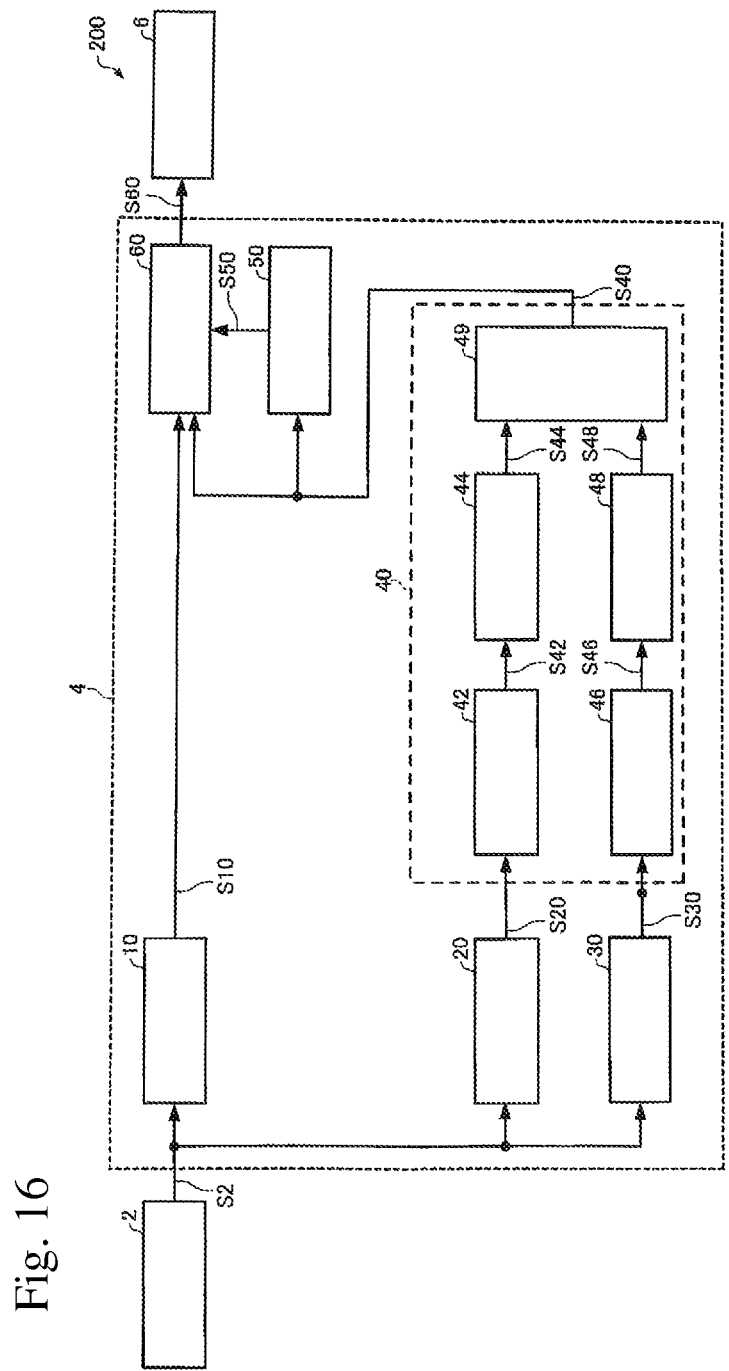
FIG. 16 is a block diagram of a radiation detector associated with a second embodiment of the present invention.

The configuration of the radiation detector associated with a second embodiment of the present invention is next described by referring to FIG. 16, which shows the configuration of the radiation detector, 200.

Those components of the radiation detector 200 associated with the second embodiment which are identical in function with their respective counterparts of the radiation detector 100 associated with the first embodiment are indicated by the same reference numerals as in the above-referenced figures and a description thereof is omitted.

As shown in FIG. 16, the radiation detector 200 is configured including a radiation detection portion 2, signal processing circuitry 4, and a spectrum generator 6.

The signal processing circuitry 4 is configured including a first differential filter portion 10, a second differential filter portion 20, a third differential filter portion 30, an event detection portion 40, a pileup detection portion 50, and a first pulse height detection portion 60.

The first differential filter portion 10 takes the first-order differential of the output signal S2 from the radiation detection portion 2 to convert the signal into a first pulsed signal S10.

The second differential filter portion 20 takes the second-order differential of the output signal S2 from the radiation detection portion 2 to convert the signal into a second pulsed signal S20. The time constant of the second differential filter portion 20 is shorter than that of the first differential filter portion 10.

The third differential filter portion 30 takes the second-order differential of the output signal S2 from the radiation detection portion 2 to convert the signal into a third pulsed signal S30. The time constant of the third differential filter portion 30 is shorter than that of the first differential filter portion 10 and longer than that of the second differential filter portion 20.

Figure 17:
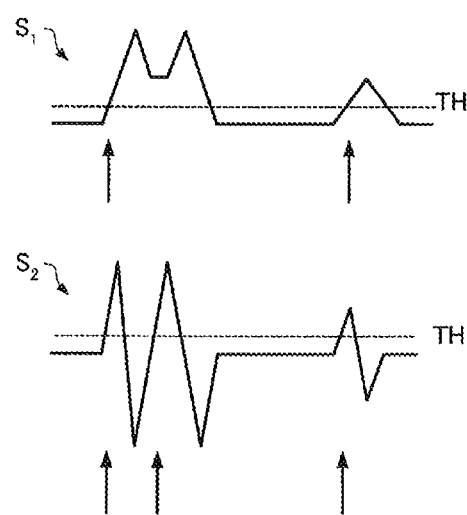
FIG. 17 is a waveform diagram comparing a pulsed signal $S_1$ obtained by taking the first-order differential of a staircase waveform and a pulsed signal $S_2$ obtained by taking the second-order differential of the waveform.

FIG. 17 is a waveform diagram comparing a pulsed signal $S_1$ obtained by taking the first-order differential of a staircase waveform and a pulsed signal $S_2$ obtained by taking the second-order differential of the staircase waveform. The pulsed signal $S_2$ obtained by second-order differentiation can have a pulse width smaller than the pulsed signal $S_1$ obtained by first-order differentiation. Therefore, as shown in FIG. 17, radiations detected at so close temporal intervals that they cannot be separated in the pulsed signal $S_1$ obtained by first-order differentiation can be separated in the pulsed signal $S_2$ obtained by second-order differentiation. Consequently, the event detection portion 40 can detect events precisely.

The pileup detection portion 50 outputs a pileup signal S50 in response to the event signal S40. In particular, the pileup detection portion 50 measures the time intervals between temporally adjacent ones of the event signal S40. If any time interval between the temporally adjacent ones of the event signal S40 is shorter than a given time, the pileup detection portion 50 outputs the pileup signal S50. If time intervals between the temporally adjacent ones of the event signal S40 are equal to or greater than the given time, the pileup detection portion 50 does not output the pileup signal S50. This given time corresponds, for example, to the time L1 during which the first pulse height detection portion 60 detects the pulse height of the first pulsed signal S10. In this way, the pileup detection portion 50 makes a decision as to whether pileup has occurred, based on the time intervals between the temporally adjacent ones of the event signal S40.

2.2. Operation of Radiation Detector

Figure 18:
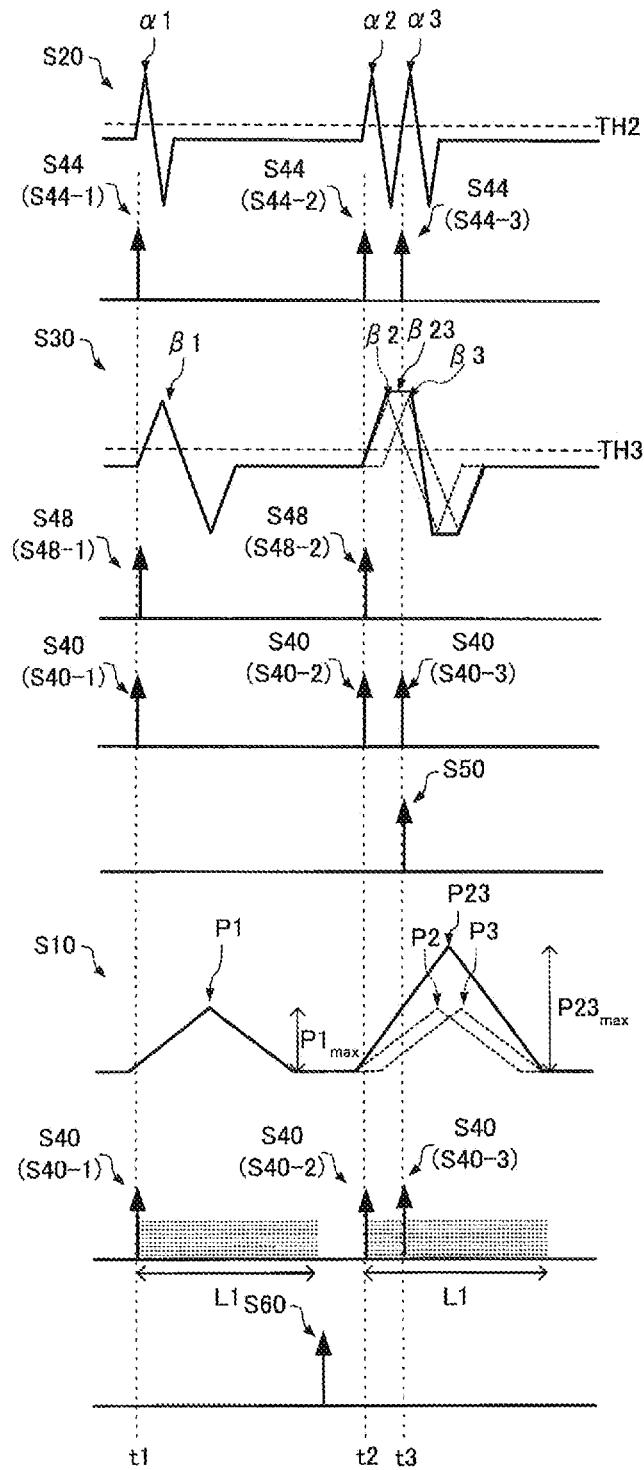
FIG. 18 is a waveform diagram illustrating one example of a set of temporal relationships among various signals in the signal processing circuitry of the radiation detector shown in FIG. 16.

The operation of the radiation detector 200 associated with the second embodiment is next described by referring to FIGS. 2 and 16 and also to FIG. 18, which is a waveform diagram showing one example of a set of temporal relationships among various signals in the signal processing circuitry 4 of the radiation detector 200.

When a first X-rays enters the radiation detection portion 2, a first step having a height of h1 appears at the output signal S2 from the radiation detection portion 2 as shown in FIG. 2.

The first differential filter portion 10 takes the first-order differential of the output signal S2. As a result, as shown in FIG. 18, a pulse P1 corresponding to the first step appears at the first pulsed signal S10. The second differential filter portion 20 and the third differential filter portion 30 take the second-order differentials of the output signal S2. As a consequence, pulses α1 and β1 corresponding to the first step appear at the second pulsed signal S20 and third pulsed signal S30, respectively.

At this time, in the event detection portion 40, the height of the second pulsed signal S20 is made to reach or exceed the threshold value TH2 by the pulse α1. The output signal S42 from the comparison portion 42 is switched from Low to High level. The rising edge detection portion 44 detects the rising edge of the output signal S42 and outputs an output signal S44-1 as shown in FIG. 18.

Similarly, the level of the third pulsed signal S30 is made to reach or exceed the threshold value TH3 by the pulse β1. The output signal S46 from the comparison portion 46 is switched from Low to High level. The rising edge detection portion 48 detects the rising edge of the output signal S46 and outputs an output signal S48-1 as shown in FIG. 18.

The arithmetic circuitry 49 receives the output signal S44-1 from the rising edge detection portion 44 and the output signal S48-1 from the rising edge detection portion 48 and outputs one event signal S40-1 at time t1.

Before a given period elapses since the event signal S40-1 was entered at time t1, the next event signal S40 is not applied to the pileup detection portion 50 and so the detection portion 50 does not output the pileup signal S50. In particular, in the example of FIG. 18, the given period is set to the period L1 during which the first pulse height detection portion 60 detects the pulse height of the first pulsed signal S10. Therefore, the next event signal S40 is not applied to the pileup detection portion 50 before the given period L1 passes since the event signal S40-1 was entered at time t1. Consequently, the pileup detection portion 50 does not output the pileup signal S50.

On the other hand, when the event signal S40-1 is applied at time t1, the first pulse height detection portion 60 starts to detect the peak height of the first pulsed signal S10. Since the pileup signal S50 is not applied, the first pulse height detection portion 60 outputs the detection signal S60 containing information about the height $P1_{max}$ of the detected pulse P1. Consequently, information about the height $P1_{max}$ of the pulse P1 is sent to the spectrum generator 6.

If two X-rays enter the radiation detection portion 2 at a short interval of time, a second step having a height of h2 and a third step having a height of h3 appear at the output signal S2 from the radiation detection portion 2 as shown in FIG. 2.

The first differential filter portion 10 takes the first-order differential of the output signal S2. Consequently, as shown in FIG. 18, the pulses P2 and P3 interfere with each other, giving rise to a pulse P23 in the first pulsed signal S10. The second differential filter portion 20 and the third differential filter portion 30 take the second-order differentials of the output signal S2. As a result, pulses $\alpha2$ and $\alpha3$ appear in the second pulsed signal S20. These pulses $\alpha2$ and $\alpha3$ interfere with each other, producing a pulse $\beta23$ in the third pulsed signal S30.

At this time, in the event detection portion 40, the level of the second pulsed signal S20 is made to reach or exceed the threshold value TH2 by the pulses $\alpha2$ and $\alpha3$. The output signal S42 from the comparison portion 42 is switched from Low to High level. The rising edge detection portion 44 detects the rising edge of the output signal S42 and produces output signals S44-2 and S44-3.

Similarly, the level of the third pulsed signal S30 is made to reach or exceed the threshold value TH3 by the pulse $\beta23$. The output signal S46 from the comparison portion 46 is switched from Low to High level. The rising edge detection portion 48 detects the rising edge of the output signal S46 and produces the output signal S48-2.

The arithmetic circuitry 49 receives the output signal S44-2 from the rising edge detection portion 44 and the output signal S48-2 from the rising edge detection portion 48 and outputs one event signal S40-2. The arithmetic circuitry 49 also receives the output signal S44-3 from the rising edge detection portion 44 and outputs the event signal S40-3. As shown in FIG. 18, the arithmetic circuitry 49 outputs the event signal S40-2 at time t2 and the event signal S40-3 at time t3.

The pileup detection portion 50 outputs the pileup signal S50 because the next event signal S40-3 is applied before the given period L1 passes since the application of the event signal S40-2.

On the other hand, when the event signal S40-2 is entered at time t2, the first pulse height detection portion 60 starts to detect the pulse height of the first pulsed signal S10. The pileup signal S50 is entered to the first pulse height detection portion 60 when a pulse height is being detected in response to the event signal S40-2 at time t3. This refrains the first pulse height detection portion 60 from outputting the detection signal S60 containing information about the height $P23_{max}$ of the detected pulse P23. Consequently, information about the height $P23_{max}$ of the pulse P23 is not sent to the spectrum generator 6.

The processing steps described so far are repeated. When pulse pileup has occurred, information about a pulse height corresponding to an X-ray energy is not sent to the spectrum generator 6. When there is no pulse pileup, the information about the pulse height is sent. Consequently, the spectrum generator 6 can build an X-ray spectrum in which generation of sum peaks is suppressed.

The radiation detector 200 has the following features. The radiation detector 200 has: the radiation detection portion 2 for detecting radiations; the first differential filter portion 10 for differentiating the output signal S2 from the radiation detection portion 2 to convert the signal S2 into the first pulsed signal S10; the second differential filter portion 20 having a time constant shorter than that of the first differential filter portion 10 and operative to take the second-order differential of the output signal S2 from the radiation detection portion 2 to convert the signal S2 into the second pulsed signal S20; the event detection portion 40 outputting the event signal S40 in response to the second pulsed signal S20; and the pulse height detection portion 60 starting to detect the pulse height of the first pulsed signal S10 in response to the event signal S40 and outputting the detection signal S60 containing information about the pulse height of the first pulsed signal S10. Since the second differential filter portion 20 takes the second-order differential of the output signal from the radiation detection portion 2 to convert the output signal into the second pulsed signal, the pulse width of the second pulsed signal S20 can be reduced. The accuracy at which pileup is identified can be enhanced. Therefore, generation of sum peaks can be suppressed.

The radiation detector 200 includes the pileup detection portion 50 that outputs the pileup signal S50 in response to the event signal S40. The pulse height detection portion 60 stops from outputting the detection signal S60 in response to the pileup signal S50. Consequently, the accuracy at which pileup is identified can be enhanced. Generation of sum peaks can be suppressed.

2.3. Modified Embodiment

Figure 19:
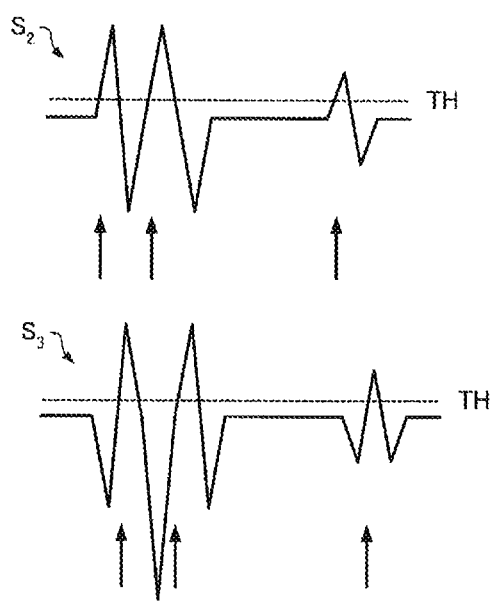
FIG. 19 is a waveform diagram comparing a pulsed signal obtained by taking the second-order differential of a staircase waveform and a pulsed signal obtained by taking the third-order differential of the waveform.

A modified embodiment of the radiation detector 200 associated with the second embodiment is next described by referring to FIG. 19. Only the differences with the above-described radiation detector 200 are described; description of similarities is omitted.

In the above-described radiation detector 200, the second differential filter portion 20 and third differential filter portion 30 take the second-order differentials of the output signal S2 from the radiation detection portion 2 to convert the signal into the pulsed signals S20 and S30, respectively.

In contrast, in the present modified embodiment, the second differential filter portion 20 and third differential filter portion 30 take the third-order differentials of the output signal S2 from the radiation detection portion 2 to convert the signal into the pulsed signals S20 and S30, respectively.

FIG. 19 is a waveform diagram comparing a pulsed signal $S_2$ obtained by taking the second-order differential of a staircase waveform and a pulsed signal $S_3$ obtained by taking the third-order differential of the staircase waveform. The pulsed signal $S_3$ can have a pulse width smaller than that of the pulsed signal $S_2$. Therefore, even if radiations are detected at such short intervals of time that they cannot be separated in the pulsed signal $S_2$ obtained by second-order differentiation, the radiations may be separated in the pulsed signal $S_3$ obtained by third-order differentiation. As a consequence, the event detection portion 40 can detect events more precisely.

According to the present modified embodiment, the differential filter portions 20 and 30 take the third-order differentials of the output signal S2 from the radiation detection portion 2 to convert the signal into the pulsed signals S20 and S30, respectively. Consequently, the accuracy at which the pileup detection portion 50 identifies pileup can be enhanced.

In this embodiment, the second differential filter portion 20 and third differential filter portion 30 take the third-order differentials of the output signal S2 to convert it into the pulsed signals S20 and S30, respectively. The mathematical operations performed by the second differential filter portion 20 and third differential filter portion 30 are not restricted to second-order differentiation and third-order differentiation, respectively. Rather, they may convert the output signal S2 into the pulsed signals S20 and S30 by taking the nth-order differentials of the output signal S2 (where n is an integer equal to or greater than 2, i.e., n≥2). Furthermore, the second differential filter portion 20 may perform second-order differentiation and the third differential filter portion 30 may perform third-order differentiation.

3. Third Embodiment

Figure 20:
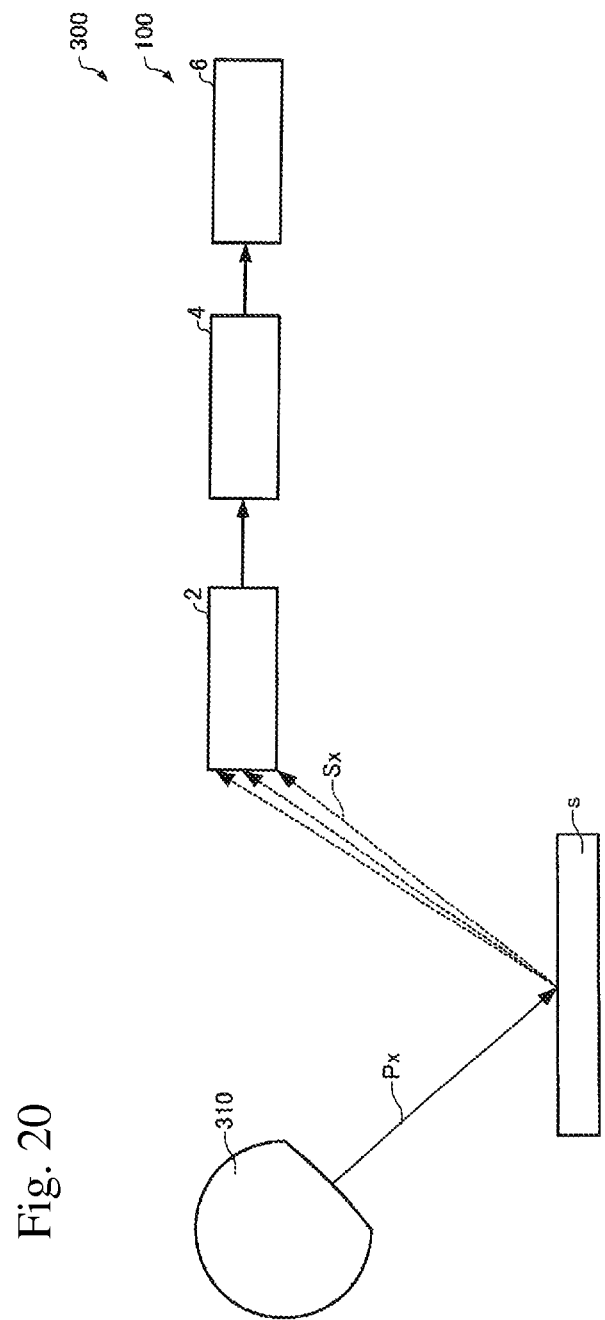
FIG. 20 is a block diagram of a sample analyzer associated with a third embodiment of the present invention.
Figure 21:
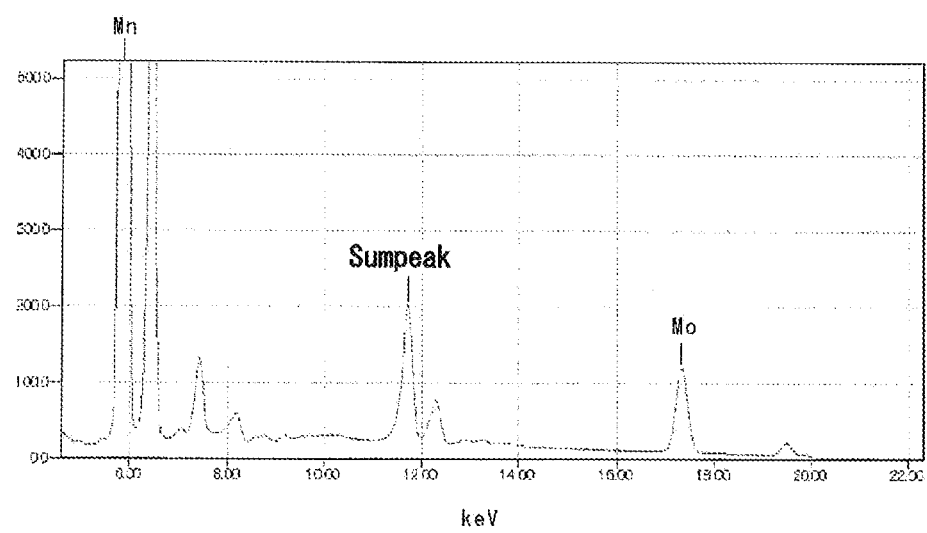
FIG. 21 is a graph showing one example of X-ray spectrum derived from a sample containing Mn by a measurement using an energy-dispersive X-ray spectrometer.

A sample analyzer associated with a third embodiment of the present invention is next described by referring to FIG. 20, which shows the configuration of the sample analyzer, 300.

As shown in FIG. 20, the sample analyzer 300 is configured including a radiation detector associated with the present invention. In the following description, the radiation detector associated with the present invention is the radiation detector 100 described above.

The sample analyzer 300 is configured including an X-ray irradiation portion 310 and the radiation detector 100. The sample analyzer 300 directs primary X-rays Px at a sample s by the X-ray irradiation portion 310 and detects secondary X-rays (fluorescent X-rays) Sx produced from the sample s in response to the irradiation by the radiation detector 100. The sample analyzer 300 is an energy-dispersive fluorescent X-ray spectrometer.

The X-ray irradiation portion 310 irradiates the sample s with the primary X-rays Px. The X-ray irradiation portion 310 is configured, for example, including an X-ray tube and a high voltage source. The X-ray irradiation portion 310 accelerates thermal electrons produced from filaments by a high voltage and causes the electrons to collide against a metal target in an unillustrated manner, thus producing the primary X-rays Px.

The primary X-rays Px generated by the X-ray irradiation portion 310 are directed at the sample s, producing the secondary X-rays (fluorescent X-rays) Sx which are detected by the radiation detector 100. The radiation detector 100 operates to create an X-ray spectrum based on the detected secondary X-rays Sx.

Since the sample analyzer 300 is configured including the radiation detector 100, generation of sum peaks can be suppressed.

In the present case, the sample analyzer associated with the present invention is an X-ray fluorescent X-ray spectrometer for directing X-rays at a sample and detecting X-rays produced from the sample. The sample analyzer associated with the invention may be any type of instrument for producing X-rays from a sample by directing an electron beam or ions at the sample and detecting the produced X-rays. For example, the sample analyzer associated with the present invention may be an electron microscope (such as a transmission electron microscope (TEM), a scanning transmission electron microscope (STEM), or a scanning electron microscope) or an electron probe microanalyzer equipped with a radiation detector associated with the present invention.

It is to be noted that the above-described embodiments and modified embodiments are merely exemplary and that the invention is not restricted thereto. For example, the embodiments and modified embodiments may be appropriately combined.

For example, in the radiation detector 100 associated with the first embodiment, a decision is made as to whether or not pileup has occurred depending on the ratio between the pulse height of the second pulsed signal S20 and the pulse height of the third pulsed signal S30. In the radiation detector 200 associated with the second embodiment, a decision is made as to whether or not pileup has occurred depending on the time differences between temporally adjacent ones of the event signal S40. These methods may be combined.

The present invention embraces configurations (e.g., configurations identical in function, method, and results or identical in purpose and advantageous effects) which are substantially identical to the configurations described in the above embodiments. Furthermore, the invention embraces configurations which are similar to the configurations described in the above embodiments except that their nonessential portions have been replaced. Additionally, the invention embraces configurations which are identical in advantageous effects to, or which can achieve the same object as, the configurations described in the above embodiments. Further, the invention embraces configurations which are similar to the configurations described in the above embodiments except that a well-known technique is added.

Having thus described my invention with the detail and particularity required by the Patent Laws, what is desired protected by Letters Patent is set forth in the following claims.

The invention claimed is:

1. A radiation detector comprising:
a radiation detection portion for detecting radiations and producing an output signal;
a first differential filter portion having a time constant and operative to differentiate the output signal from the radiation detection portion for converting the signal into a first pulsed signal;
a second differential filter portion having a time constant shorter than the time constant of the first differential filter portion and operative to differentiate the output signal from the radiation detection portion for converting the signal into a second pulsed signal;
a third differential filter portion having a time constant longer than the time constant of the second differential filter portion and shorter than the time constant of the first differential filter portion and operative to differentiate the output signal from the radiation detection portion for converting the signal into a third pulsed signal;
an event detection portion for outputting an event signal in response to the second and third pulsed signals;
a pileup detection portion for outputting a pileup signal in response to a ratio between a pulse height of the second pulsed signal and a pulse height of the third pulsed signal; and
a pulse height detection portion operative to start detection of the pulse height of the first pulsed signal in response to the event signal and to output a detection signal containing information about the pulse height of the first pulsed signal,
wherein said pulse height detection portion stops from outputting the detection signal in response to the pileup signal.

2. The radiation detector according to claim 1, wherein said second differential filter portion takes the nth-order differential of the output signal (where n is an integer equal to or greater than 2 (i.e., n≥2)) from said radiation detection portion to convert the signal into said second pulsed signal.

3. A radiation detector comprising:
a radiation detection portion for detecting radiations and producing an output signal;
a first differential filter portion having a time constant and operative to differentiate the output signal from the radiation detection portion for converting the signal into a first pulsed signal;
a second differential filter portion having a time constant shorter than the time constant of the first differential filter portion and operative to take the nth-order differential (where n is an integer equal to or greater than 2 (i.e., n≥2)) of the output signal from the radiation detection portion for converting the signal into a second pulsed signal;
an event detection portion for outputting an event signal in response to the second pulsed signal; and
a pulse height detection portion operative to start detection of a pulse height of the first pulsed signal in response to the event signal and to output a detection signal containing information about the pulse height of the first pulsed signal.

4. The radiation detector according to claim 3, further comprising a pileup detection portion for outputting a pileup signal in response to said event signal, and wherein said pulse height detection portion stops from outputting said detection portion in response to the pileup signal.

5. The radiation detector according to claim 1, wherein the output signal from said radiation detection portion is a staircase waveform having steps of heights corresponding to energies of said radiations.

6. The radiation detector according to claim 3, wherein the output signal from said radiation detection portion is a staircase waveform having steps of heights corresponding to energies of said radiations.

7. A sample analyzer including a radiation detector as set forth in claim 1.

8. A sample analyzer including a radiation detector as set forth in claim 3.

* * * * *